(12) United States Patent
Bloom

(10) Patent No.: US 7,420,008 B2
(45) Date of Patent: Sep. 2, 2008

(54) HYDROGENATED AND PARTIALLY HYDROGENATED HEAT-BODIED OILS

(75) Inventor: Paul D. Bloom, Decatur, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 633 days.

(21) Appl. No.: 10/428,146

(22) Filed: May 2, 2003

(65) Prior Publication Data

US 2004/0030056 A1    Feb. 12, 2004

Related U.S. Application Data

(60) Provisional application No. 60/434,419, filed on Dec. 19, 2002, provisional application No. 60/403,505, filed on Aug. 15, 2002, provisional application No. 60/376,807, filed on May 2, 2002.

(51) Int. Cl.
| | |
|---|---|
| *C08L 91/00* | (2006.01) |
| *C08L 91/06* | (2006.01) |
| *C09D 4/00* | (2006.01) |
| *C09D 11/02* | (2006.01) |
| *C09D 101/00* | (2006.01) |
| *C09D 201/00* | (2006.01) |

(52) U.S. Cl. ............... 524/270; 524/313; 524/277; 106/220; 106/222; 106/224; 106/229

(58) Field of Classification Search ............ 524/270, 524/313, 277; 106/220, 222, 224, 229
See application file for complete search history.

(56) References Cited

U.S. PATENT DOCUMENTS

| | | | |
|---|---|---|---|
| 2,519,492 A * | 8/1950 | Morgan ............ 106/253 |
| 2,717,882 A | 9/1955 | Kiebler, Jr. et al. | |
| 3,297,730 A | 1/1967 | Fischer et al. | |
| 5,122,188 A | 6/1992 | Erhan et al. | |
| 5,713,990 A | 2/1998 | Erhan et al. | |
| 6,291,409 B1 * | 9/2001 | Kodali et al. ............ 508/491 |

FOREIGN PATENT DOCUMENTS

| | | |
|---|---|---|
| GB | 394073 | 6/1933 |
| GB | 470498 | 8/1937 |
| GB | 744005 | 1/1956 |
| GB | 813885 | 5/1959 |

OTHER PUBLICATIONS

International Search Report for International Application No. PCT/US03/13727 mailed on Sep. 11, 2003.
Takeoka, G.R., et al., "Effect of Heating in the Characteristics and Composition of Frying Oils and Fats. I. Chemical Composition," Tektran, Agircultural Service, available online at www.nal.usda.gov/ttic/tektran/data/000007/94/0000079483.html (1998).

* cited by examiner

*Primary Examiner*—William K Cheung
(74) *Attorney, Agent, or Firm*—Sterne, Kessler, Goldstein & Fox P.L.L.C.

(57) ABSTRACT

Polymerized oils (heat-bodied oils) were hydrogenated to make a semi-crystalline wax-like material. The process of the present invention yields hydrogenated polymerized oils that can be used as bio-renewable replacements for micro-crystalline wax and petrolatums raw materials in products that are comprised of such materials. The present invention is directed to a composition comprising a hydrogenated polymerized oil, a composition consisting essentially of a hydrogenated polymerized oil and a process of preparing a hydrogenated polymerized oil. The present invention is also directed to a composition comprising a hydrogenated blown oil, a composition consisting essentially of a hydrogenated blown oil and a process for preparing a hydrogenated blown oil. The present invention is also directed to a composition comprising a hydrogenated copolymer oil or a hydrogenated copolymer/vegetable oil blend, a composition consisting essentially of a hydrogenated copolymer oil or a hydrogenated copolymer/vegetable oil blend, and a process for preparing a hydrogenated copolymer oil or hydrogenated copolymer/vegetable oil blend.

56 Claims, No Drawings

HYDROGENATED AND PARTIALLY HYDROGENATED HEAT-BODIED OILS

CROSS-REFERENCE TO RELATED APPLICATIONS

This application claims benefit under 35 U.S.C. § 119(e) to U.S. Provisional Applications: 60/376,807, filed May 2, 2002; 60/403,505, filed Aug. 15, 2002; and 60/434,419, filed Dec. 19, 2002, hereby incorporated herein by reference.

BACKGROUND OF THE INVENTION

1. Field of the Invention

Polymerized oils ("heat-bodied oils"), blown oils ("heavy bodied blown oils"), vegetable-based copolymer oils, and vegetable oil/vegetable-based copolymer oil blends were hydrogenated to make a semi-crystalline wax-like material. The hydrogenated products can be used as bio-renewable replacements for micro-crystalline wax and petrolatum raw materials in products that are comprised of such materials.

2. Background Art

Petrolatums and micro-crystalline waxes are components in a large number of products ranging from personal consumer goods to industrial lubricants. Petrolatums and micro-crystalline waxes are derived from petroleum. Thus, the supply of such ubiquitous raw materials is non-renewable. Petrolatums are semisolid mixtures of hydrocarbons, and are neutral, unctuous, odorless, and tasteless. They have applications in the formulation of products such as creams, lotions, hair preparations, cosmetics, candles, ointments, lubricants and coatings. Typical petrolatums have cone penetration of above 100 dmm and less than 275 dmm (ASTM D937). The melting range of petrolatums is about 38° C. to about 60° C. Micro-crystalline wax is a solid mixture of linear, branched and cyclic hydrocarbons derived from petroleum. It is obtained from the heavy lubricating oil fraction derived from crude oil, subsequent to the removal of paraffin wax. Its characteristics resemble those of the natural waxes closely, including its high melting point, high viscosity, flexibility at low temperatures, and high cohesion and adhesion. Micro-crystalline waxes are usually higher in molecular weight, viscosity and melting point than paraffin wax. Typically, micro-crystalline wax melting points range from 54° C. to about 102° C. They have needle penetration of above 3 dmm and less than 100 dmm (ASTM D1321). Viscosities are higher than 5.75 centistokes at 100° C.

Heat polymerized oils ("polymerized oils"), often referred to as heat bodied oils, are prepared from unsaturated oils. Linseed, safflower and soybean oils are commonly used as the starting materials for this process. In addition, fish oils are commonly heat polymerized. Depending on the oil used, the temperature is held between about 288° C. to about 316° C. until a product with a desired viscosity is obtained. Longer reaction times are used to reach a higher viscosity product. The viscosity of polymerized oils can range from P to $Z_9$. During the reaction, the unsaturated triglycerides react to form polymers. As polymerization takes place, new carbon-carbon bonds are formed between triglyceride units.

Polymerized oils have some improved properties for paint, coatings and ink applications in comparison to unsaturated triglycerides. These properties include improved leveling, pigment wetting, and less yellowing. Typical polymerized oils still contain a high amount of unsaturation. The iodine value ("IV") of heat bodied linseed oils ranges from approximately 115-150. Polymerized oils are reactive, viscous liquids at room temperature.

Blown oils differ from polymerized oils. Blown linseed oil is prepared by bubbling air through the oil while heating to temperatures of about 110° C. During the process, the oil is polymerized and partially oxidized.

Vegetable-based copolymer oils such as maleinized and dicyclopentadiene oils are characterized by a fast drying time and water resistance. Blending such copolymer oils with vegetable oils yields oil blends that also possess characteristic properties and provides more diversity of chemical properties. Other attributed properties can include the unique hardness of a dried coating when such copolymer oils are incorporated into paint or coating formulations.

SUMMARY OF INVENTION

The present invention provides compositions comprised of hydrogenated polymerized oils, blown oils, copolymer oils, copolymer/vegetable oil blends and neat vegetable oils and fatty acid esters. Such hydrogenated oil compositions possess properties similar to the properties of petrolatums and micro-crystalline waxes. Thus, it is envisioned that such hydrogenated oil compositions can be used as a replacement in formulations comprising petrolatums and/or micro-crystalline waxes. Therefore, compositions comprising a hydrogenated oil as described herein also include, but are not limited to, an array of personal, medical and industrial products. Because the present invention can be derived from fish, animal, vegetable, synthetic and genetically-modified plant oils, which are a renewable resource, the present invention is a desirable alternative to petrolatums and micro-crystalline waxes, which are derived from non-renewable petroleum sources.

The present invention is directed to a composition comprising a hydrogenated polymerized oil, a composition consisting essentially of a hydrogenated polymerized oil and a process of preparing a hydrogenated polymerized oil.

The present invention is directed to a composition comprising a hydrogenated heavy bodied blown oil, a composition consisting essentially of a hydrogenated heavy bodied blown oil and a process of preparing a hydrogenated heavy bodied blown oil.

In yet another aspect, the invention is directed to a composition comprising a hydrogenated copolymer oil, a composition consisting essentially of a hydrogenated copolymer oil and a process of preparing a hydrogenated copolymer oil.

In yet another aspect, the invention is directed to a composition comprising a hydrogenated blend of a copolymer oil and a vegetable oil, a composition consisting essentially of a hydrogenated blend of a copolymer oil and a vegetable oil, and a process of preparing a hydrogenated blend of a copolymer oil and a vegetable oil.

DETAILED DESCRIPTION OF THE INVENTION

In a first aspect, the present invention is directed to a composition comprising a hydrogenated polymerized oil. In this aspect, the hydrogenated polymerized oil is derived from an oil selected from the group consisting of fish, animal, vegetable, synthetic and genetically-modified plant oils, and derivatives and mixtures thereof. Preferably, the oil is a vegetable oil. More preferably, the vegetable oil is selected from the group consisting of high eurucic acid rapeseed, soybean, safflower, canola, castor, sunflower and linseed oils. In an embodiment of the first aspect, it is preferable that the hydrogenated polymerized oil has an iodine value below about 110. More preferably, the iodine value is below about 70; most preferably it is below about 30. Compositions comprising a hydrogenated polymerized oil include vegetable-based jellies and waxes. Other compositions include, but are not limited to, creams, lotions, hair preparations, cosmetics, candles, ointments, lubricants and coatings. A preferred embodiment of this aspect of the present invention is a composition comprising a hydrogenated polymerized oil, wherein the hydrogenated polymerized oil replaces or supplements a petrolatum or micro-crystalline wax material ingredient in the composition. In this embodiment, any product containing a petrolatum or micro-crystalline wax can be reformulated to comprise a hydrogenated polymerized oil, such a hydrogenated polymerized oil reduces the amount or eliminates entirely the requirement of a petrolatum or micro-crystalline wax component in the composition. When such a composition is reformulated in this manner, the composition retains those characteristics attributed to a petrolatum or micro-crystalline wax material, but the composition contains a reduced amount or none of these materials.

A composition of the present invention can be a semi-solid or wax-like material. The state of the composition will depend on the degree of hydrogenation, which is measured by the IV. The hardness or softness of the material may be a result of the level of hydrogenation. Thus, when a material having a different consistency is desired, the oil(s) comprising the composition may be hydrogenated fully or partially to yield the desired consistency. Depending on the material's hardness or softness preferred, the oil(s) comprising the composition may be hydrogenated to the extent desired. Although the physical characteristics of the composition can be determined empirically, the IV values of the oil(s) can be used to measure the degree of hydrogenation for any given embodiment of the present invention. The term "hydrogenated" thus encompasses varying degrees of partial and full hydrogenation. The IV values of the hydrogenated oil(s) claimed herein will fall below about 110, more preferably below about 70, and most preferably below about 30. Iodine values with these ranges are characteristic of the desired physical nature of the oil(s) comprising the present invention. The present invention describes a vegetable-based composition that possesses characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another preferred embodiment, the present invention is directed to a vegetable based jelly or wax comprising a hydrogenated polymerized vegetable oil, wherein said oil has an iodine value below about 110. More preferably, the iodine value is below about 70, most preferably below about 30. A vegetable based jelly as described herein would be comparable to a petroleum based jelly such as Vaseline® petroleum jelly. In this embodiment the composition can be a semi-solid or wax-like material at a temperature between about 0° to about 100° C. possessing characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another preferred embodiment, the composition comprising a hydrogenated polymerized oil further comprises one or more vegetable oils. The one or more vegetable oils are derived from a group of vegetable oils consisting of high eurucic acid rapeseed, soybean, safflower, canola, castor, sunflower and linseed oils. Preferably, the hydrogenated polymerized oil is derived from linseed oil or soy, and the vegetable oil is sunflower, high eurucic acid rapeseed or soy oil.

In another preferred embodiment, the composition comprising a hydrogenated polymerized oil further comprises a fatty acid ester of triglycerol. The fatty acid ester of triglycerol can be a mono-, di- or tri-ester. More preferably, the fatty acid ester is behenic acid ester. Such esters can be added to modify the micro-crystallinity of wax-like solids or otherwise enhance the desired physical characteristics describe above.

In another preferred embodiment, the composition comprising a hydrogenated polymerized oil further comprises a fatty acid ester of triglycerol and a refined, bleached and deodorized (RBD) vegetable oil. In such a composition, it is preferred that the hydrogenated polymerized oil, the RBD vegetable oil and the fatty acid ester are respectively present in a range of ratios wherein the final product has the desired properties. Such properties may be affected by the relative ratios of the above ingredients and can vary depending on the composition's end-use, which are described above. Preferably, the RBD oil is selected from the group of vegetable oils consisting of high eurucic acid rapeseed, soybean, safflower, canola, castor, sunflower and linseed oils. In a most preferred embodiment, the hydrogenated polymerized oil is derived from soy oil, the RBD oil is soy oil, and the fatty acid ester is behenic acid ester. In such a composition, it is most preferred that the hydrogenated polymerized soy oil, the RBD soy oil and the behenic acid ester. In any of these embodiments, the ratios of hydrogenated polymerized oil to RBD vegetable oil to fatty acid ester can be modified to yield the desired product consistency in accord with the final disposition of the product. The respective amount of any of the above primary ingredients can be adjusted from between about 1% to about 98% of the composition. As exemplified herein (Example 15), one embodiment comprises hydrogenated polymerized soy oil, RBD soy oil and behenic acid ester respectively present in a ratio of about 49:50:1.

In another preferred embodiment, the composition comprising a hydrogenated polymerized oil further comprises one or more hydrogenated vegetable oils. The one or more hydrogenated vegetable oils are derived from a group of vegetable oils consisting of high eurucic acid rapeseed, soybean, safflower, canola, castor, sunflower and linseed oils. Preferably, the hydrogenated vegetable oil is derived from high eurucic acid rapeseed, soy or castor oil and the hydrogenated polymerized oil is derived from linseed oil.

In yet another preferred embodiment, the one or more hydrogenated vegetable oils described above are blended to form a first oil mixture, which is then admixed with the hydrogenated polymerized oil. The first oil mixture can be admixed with the hydrogenated polymerized oil at a ratio of between about 1:1 to about 1:100 first oil mixture to hydrogenated polymerized oil. The ratio can be adjusted accordingly to suit the desired end-use of the composition or as needed for any reason. Preferably, the first oil mixture is a blend of hydrogenated soy oil and hydrogenated high eurucic acid rapeseed oil, wherein the ratio of hydrogenated soy oil to hydrogenated high eurucic acid rapeseed oil is about 1:1. This ratio forms a blend that is useful as a crystal modifier, but the ratio can be adjusted accordingly to suit the desired end-use of the composition or as needed for any reason. Such a first oil mixture can be added to any hydrogenated polymerized oil at a ratio described above. More preferably, the hydrogenated polymerized oil is derived from linseed or soy oils. Most preferably, the hydrogenated polymerized oil is derived from linseed oil.

In another preferred embodiment, the composition comprising a hydrogenated polymerized oil and one or more hydrogenated vegetable oils further comprises a vegetable oil. Such a vegetable oil is selected from the group consisting of high eurucic acid rapeseed, soybean, safflower, canola, castor, sunflower and linseed oils. Preferably, the vegetable oil is sunflower oil. In this embodiment, the hydrogenated polymerized oil, one or more hydrogenated vegetable oils and the vegetable oil are respectively present in a range of ratios wherein the final product has the desired properties. Such properties may be affected by the relative ratios of the above ingredients and can vary depending on the composition's end-use, which are described above. In an embodiment exemplified herein (Example 14), the composition comprises about 2 parts sunflower oil, 1 part hydrogenated polymerized linseed oil, and 1 part one or more hydrogenated vegetable oils as a first oil mixture (described above), wherein, in this instance, the first oil mixture consists essentially of a 1:1 blend of hydrogenated soy oil and hydrogenated high eurucic acid rapeseed oil. This product has a physical consistency comparable to that of petroleum jelly. In another embodiment exemplified herein (Example 16), the composition comprises about 2 parts sunflower oil, 1 part hydrogenated polymerized linseed oil, and 1 part partially hydrogenated soy oil. This product has a physical consistency comparable to that of petroleum jelly.

The composition comprising a hydrogenated polymerized oil and one or more hydrogenated vegetable oils can further comprise a fatty acid ester of triglycerol. The hydrogenated vegetable oil(s) can be blended with said fatty acid ester of triglycerol at a ratio of between about 1:1 to about 100:1 hydrogenated vegetable oil(s) to said fatty acid ester to form a first blend. The ratio of oil and ester in the first blend can be adjusted accordingly to suit the desired end-use of the composition or as needed for any reason. The first blend can be admixed with the hydrogenated polymerized oil at a ratio of between about 1:1 to about 100:1 hydrogenated polymerized oil to said first blend to form the composition. In this embodiment, the hydrogenated polymerized oil, one or more hydrogenated vegetable oils and the fatty acid ester are respectively present in a range of ratios wherein the final product has the desired properties. Such properties may be affected by the relative ratios of the above ingredients and can vary depending on the composition's end-use, which are described above. Preferably, the hydrogenated polymerized oil is derived from linseed or soy oil; the hydrogenated vegetable oil is derived from soy oil; and the fatty acid ester is a behenic acid ester. In an embodiment exemplified herein (Example 12), the blend of hydrogenated vegetable oil/fatty acid ester of triglycerol and hydrogenated polymerized oil to form a final ratio of about 40:10:50 hydrogenated soy oil, behenic acid ester and polymerized linseed oil.

In all aspects, the composition can further comprise a free radical scavenger or an anti-oxidant. Preferably, said free radical scavenger or anti-oxidant is Vitamin E.

In another aspect, the composition can comprise one or more hydrogenated polymerized vegetable oils, a first oil mixture consisting essentially of hydrogenated soy and high eurucic acid rapeseed oils, one or more vegetable oils and vitamin E. An embodiment exemplified herein (Example 17) comprises a first oil mixture of hydrogenated soy and high eurucic acid rapeseed oils at a ratio of about 1:1.

In another embodiment, the present invention describes a composition consisting essentially of a hydrogenated polymerized oil. The hydrogenated polymerized oil as described herein has an iodine value below about 110. Preferably, the iodine value is below about 70, most preferably below about 30.

In another preferred embodiment, the present invention is directed to a vegetable-based coating comprising a hydrogenated polymerized vegetable oil having an iodine value below about 110. More preferably, the iodine value is below about 70, most preferably below about 30. The vegetable based coating described herein would be useful for packaging coatings and the like. Such coatings include, but are not limited to, polyurethane coatings.

In yet another aspect, the present invention is directed to a process of preparing a hydrogenated polymerized oil composition. The process comprises hydrogenating a polymerized oil. More preferably, hydrogenation comprises reacting the oil under a vapor pressure of hydrogen in the presence of a catalyst. In another preferred aspect, hydrogenation further comprises:

a) purging a reaction vessel containing a polymerized oil and a catalyst with hydrogen prior to pressurizing with hydrogen, b) heating the pressurized vessel containing the oil and catalyst to a temperature of between about 150° C. to about 400° C., c) adjusting the vapor pressure in the vessel by feeding hydrogen gas into the heated vessel, and d) cooling and filtering the product produced in steps a through c.

Preferably, the vapor pressure of hydrogen is between about 50 psig to about 1000 psig.

Preferably, the catalyst is selected from the group consisting of a nickel-based catalyst, copper, copper-chromite, platinum and palladium.

In another aspect, the present invention describes a process wherein the product is a semi-solid or wax-like material at a temperature between about 0° C. to about 100° C. comprising a hydrogenated polymerized oil. Such a material contains a hydrogenated oil with an iodine value below about 110. Preferably, the iodine value is below about 70. More preferably, the iodine value is below about 30.

In another embodiment, the present invention is directed to a process wherein said polymerized oil is derived from an oil selected from the group consisting of fish, animal, vegetable, synthetic and genetically-modified plant oils, and derivatives and mixtures thereof. Preferably the oil is a vegetable oil. More preferably, the vegetable oil is selected from the group consisting of soybean, safflower, canola, castor, sunflower and linseed oils.

In another aspect, the present invention describes a composition comprising a hydrogenated blown oil. In this aspect of the present invention, the hydrogenated blown oil is derived from an oil selected from the group consisting of fish, animal, vegetable, synthetic and genetically-modified plant oils, and derivatives and mixtures thereof. Preferably, the oil is a vegetable oil. More preferably, the vegetable oil is selected from the group consisting of high eurucic acid rapeseed, soybean, safflower, canola, castor, sunflower and linseed oils. In an embodiment of the first aspect, it is preferable that the hydrogenated blown oil has a hydroxyl value below about 150, and an iodine value below about 110. More preferably, the iodine value is below about 70, most preferably below about 30. Compositions comprising a hydrogenated blown oil include vegetable-based jellies and waxes. Other compositions include, but are not limited to, creams, lotions, hair preparations, cosmetics, candles, ointments, lubricants and coatings, including but not limited to polyurethane coatings. A preferred embodiment of this aspect of the present invention is a composition comprising a hydrogenated blown oil, wherein the composition replaces or supplements a petrolatum or micro-crystalline wax material ingredient in the composition. In this embodiment, any product containing a petrolatum or micro-crystalline wax can be reformulated to comprise a hydrogenated blown oil, such a hydrogenated blown oil reduces the amount or eliminates entirely the requirement of a petrolatum or micro-crystalline wax component in the composition. When such a composition is reformulated in this manner, the composition retains those characteristics attributed to a petrolatum or micro-crystalline wax material, but the composition contains a reduced amount or none of these materials.

In another preferred embodiment, the present invention is directed to a vegetable based jelly or wax comprising a hydrogenated blown vegetable oil, wherein said oil has an iodine value below about 110. More preferably, the iodine value is below about 70, most preferably below about 30. A vegetable based jelly as described herein would be comparable to a petroleum based jelly such as Vaseline® petroleum jelly. In this embodiment the composition can be a semi-solid or wax-like material at a temperature between about 0° to about 100° C. possessing characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another aspect, the present invention describes a composition consisting essentially of a hydrogenated blown oil.

In all aspects it is preferred that the hydrogenated blown oil is derived from an oil selected from the group consisting of fish, animal, vegetable, synthetic and genetically-modified plant oil, and derivatives and mixtures thereof. More preferably, the blown oil is derived from a vegetable oil. Most preferably, the vegetable oil is high eurucic acid rapeseed, soybean, safflower, canola, castor, sunflower or linseed oil. Preferably, such a hydrogenated blown oil has a hydroxyl value below about 150. Preferably, a hydrogenated blown oil composition has an iodine value below about 110. More preferably, the iodine value is below about 70, most preferably below about 30. More preferably, the composition consisting essentially of a hydrogenated blown oil is a semi-solid or wax-like material at a temperature between about 0° to about 100° C. In this embodiment, the invention describes a composition that possesses characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another preferred embodiment, the present invention is directed to a vegetable-based coating comprising a hydrogenated blown vegetable oil, wherein said oil has an iodine value below about 110. More preferably, the iodine value is below about 70, most preferably below about 30. The vegetable based coating described herein would be useful for packaging coatings and the like.

In another aspect, the present invention describes a process for preparing a hydrogenated blown oil composition. The process comprises hydrogenating a blown oil. More preferably, hydrogenation comprises reacting the oil under a vapor pressure of hydrogen in the presence of a catalyst. In another preferred aspect, hydrogenation further comprises:

a) purging a reaction vessel containing a blown oil and a catalyst with hydrogen prior to pressurizing with hydrogen, b) heating the pressurized vessel containing the oil and catalyst to a temperature of between about 150° C. to about 400° C., c) adjusting the vapor pressure in the vessel by feeding hydrogen gas into the heated vessel, and d) cooling and filtering the product produced in steps a through c.

Preferably, the vapor pressure of hydrogen is between about 50 psig to about 1000 psig.

Preferably, the catalyst is selected from the group consisting of a nickel-based catalyst, copper, copper-chromite, platinum and palladium.

In another aspect, the present invention describes a process wherein said hydrogenated blown oil product has a hydroxyl value below about 150.

Preferably, the hydrogenated blown oil product has an iodine value below about 110. More preferably, the iodine value is below about 70, most preferably below about 30.

In one embodiment, the blown oil is derived from an oil selected from the group consisting of fish, animal, vegetable, synthetic and genetically-modified plant oil, and derivatives and mixtures thereof. Preferably, the blown oil is derived from a vegetable oil. Most preferably, the vegetable oil is linseed or soy oil.

In another aspect, the present invention describes a composition comprising a hydrogenated copolymer oil. In an embodiment of this aspect, it is preferable that the hydrogenated copolymer oil has an iodine value below about 110. More preferably, the iodine value is below about 70, most preferably below about 30. Compositions comprising a hydrogenated copolymer oil include vegetable-based jellies and waxes. Other compositions include, but are not limited to, creams, lotions, hair preparations, cosmetics, candles, ointments, lubricants and coatings. A preferred embodiment of this aspect of the present invention is a composition comprising a hydrogenated copolymer oil, wherein the hydrogenated copolymer oil replaces or supplements a petrolatum or micro-crystalline wax material ingredient in the composition. In this embodiment, any product containing a petrolatum or micro-crystalline wax can be reformulated to comprise a hydrogenated copolymer oil, such a hydrogenated copolymer oil reduces the amount or eliminates entirely the requirement of a petrolatum or micro-crystalline wax component in the composition. When such a composition is reformulated in this manner, the composition retains those characteristics attributed to a petrolatum or micro-crystalline wax material, but the composition contains a reduced amount or none of these materials.

In another preferred embodiment, the present invention is directed to a vegetable based jelly or wax comprising a hydrogenated copolymer oil, wherein said oil has an iodine value below about 110. More preferably, the iodine value is below about 70, most preferably below about 30. A vegetable based jelly as described herein would be comparable to a petroleum based jelly such as Vaseline® petroleum jelly. In this embodiment the composition can be a semi-solid or wax-like material at a temperature between about 0° to about 100° C. possessing characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another aspect, the present invention describes a composition consisting essentially of a hydrogenated copolymer oil.

The hydrogenated copolymer oil has an iodine value below about 110. More preferably, the iodine value is below about 70, most preferably below about 30. Examples of copolymer oils suitable for hydrogenation include, but are not limited to, dicyclopentadiene and maleic anhydride/polyol oils. With regard to a copolymer oil possessing hydroxyl moieties, such as a maleic anhydride/polyol oil, the hydroxyl value of such an oil is preferably below about 150. More preferably, the composition consisting essentially of a hydrogenated copolymer oil is a semi-crystalline wax-like material at a temperature between about 0° to about 100° C. In this embodiment, the invention describes a composition that possesses characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another preferred embodiment, the present invention is directed to a vegetable-based coating comprising a hydrogenated copolymer oil having an iodine value below about 110. More preferably, the iodine value is below about 70, most preferably below about 30. The vegetable based coating described herein would be useful for packaging coatings and the like.

The present invention is also directed to a product having similar characteristics as a microcrystalline wax or petrolatum product, wherein the product is formulated using any of the following ingredients in any combination: one or more neat vegetable oils, one or more hydrogenated (including partially hydrogenated) vegetable oils, one or more hydrogenated (including partially hydrogenated) polymerized oils, one or more hydrogenated (including partially hydrogenated) blown oils, one or more hydrogenated (including partially hydrogenated) copolymer oils, a fatty acid ester of a triglycerol and an antioxidant.

In another aspect, the present invention describes a process for preparing a hydrogenated copolymer oil composition. The process comprises hydrogenating a copolymer oil. More preferably, hydrogenation comprises reacting the oil under a vapor pressure of hydrogen in the presence of a catalyst. In another preferred aspect, hydrogenation further comprises:

a) purging a reaction vessel containing a copolymer oil and a catalyst with hydrogen prior to pressurizing with hydrogen, b) heating the pressurized vessel containing the oil and catalyst to a temperature of between about 150° C. to about 400° C., c) adjusting the vapor pressure in the vessel by feeding hydrogen gas into the heated vessel, and d) cooling and filtering the product produced in steps a through c.

Preferably, the vapor pressure of hydrogen is between about 50 psig to about 1000 psig.

Preferably, the catalyst is selected from the group consisting of a nickel-based catalyst, copper, copper-chromite, platinum and palladium.

In another aspect, the present invention describes a process wherein said hydrogenated copolymer oil product has a hydroxyl value below about 150.

Preferably, the hydrogenated copolymer oil product has an iodine value below about 110. More preferably, the iodine value is below about 70, most preferably below about 30.

In another aspect, the present invention describes a composition comprising a hydrogenated copolymer/vegetable oil blend. Preferably, the vegetable oil is selected from the group consisting of soybean, safflower, canola, castor, sunflower and linseed oils. In an embodiment of the first aspect, it is preferable that the hydrogenated copolymer/vegetable oil blend has an iodine value below about 110. More preferably, the iodine value is below about 70, most preferably below about 30. Compositions comprising a hydrogenated copolymer/vegetable oil blend include vegetable-based jellies and waxes. Other compositions include, but are not limited to, creams, lotions, hair preparations, cosmetics, candles, ointments, lubricants and coatings. A preferred embodiment of this aspect of the present invention is a composition comprising a hydrogenated copolymer/vegetable oil blend, wherein the hydrogenated copolymer/vegetable oil blend replaces or supplements a petrolatum or micro-crystalline wax material ingredient in the composition. In this embodiment, any product containing a petrolatum or micro-crystalline wax can be reformulated to comprise a hydrogenated copolymer/vegetable oil blend, such a hydrogenated copolymer/vegetable oil blend reduces the amount or eliminates entirely the requirement of a petrolatum or micro-crystalline wax component in the composition. When such a composition is reformulated in this manner, the composition retains those characteristics attributed to a petrolatum or micro-crystalline wax material, but the composition contains a reduced amount or none of these materials.

In another preferred embodiment, the present invention is directed to a vegetable based jelly or wax comprising a hydrogenated copolymer/vegetable oil blend, wherein said oil blend has an iodine value below about 110. More preferably, the iodine value is below about 70, most preferably below about 30. A vegetable based jelly as described herein would be comparable to a petroleum based jelly such as Vaseline® petroleum jelly. In this embodiment the composition can be a semi-solid or wax-like material at a temperature between about 0° to about 100° C. possessing characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

In another aspect, the present invention describes a composition consisting essentially of a hydrogenated copolymer/vegetable oil blend. More preferably, the composition consisting essentially of a hydrogenated copolymer/vegetable oil blend is a semi-crystalline wax-like material at a temperature between about 0° to about 100° C. The hydrogenated copolymer/vegetable oil blend as described herein has an iodine value below about 110. Preferably, the iodine value is below about 70, most preferably below about 30. In this embodiment, the invention describes a composition that possesses characteristics such as Congeal Point (ASTM D938), Drop Melt Viscosity (ASTM D127), Kinematic Viscosity (ASTM D445), Needle Penetration (ASTM D1321), similar to the properties of a petrolatum or micro-crystalline wax.

Examples of copolymer oils suitable for blending with a vegetable oil include, but are not limited to, dicyclopentadiene and maleic anhydride/polyol oils. Vegetable oils suitable for blending with a copolymer oil include any vegetable derived oil or genetically-modified plant oil. Preferably, the vegetable oil in the oil blend is soybean, safflower, canola, castor, sunflower or linseed oil. More preferably, the vegetable oil in the oil blend is linseed oil, and the copolymer oil is dicyclopentadiene or maleic anhydride/polyol oil.

In another preferred embodiment, the present invention is directed to a vegetable-based coating comprising a hydrogenated copolymer/vegetable oil blend having an iodine value below about 110. More preferably, the iodine value is below about 70, most preferably below about 30. The vegetable based coating described herein would be useful for packaging coatings and the like.

In another aspect, the present invention describes a process for preparing a hydrogenated copolymer/vegetable oil composition. The process comprises hydrogenating a copolymer/vegetable oil. More preferably, hydrogenation comprises reacting the oil under a vapor pressure of hydrogen in the presence of a catalyst. In another preferred aspect, hydrogenation further comprises:

a) purging a reaction vessel containing a copolymer/vegetable oil and a catalyst with hydrogen prior to pressurizing with hydrogen, b) heating the pressurized vessel containing the oil and catalyst to a temperature of between about 150° C. to about 400° C., c) adjusting the vapor pressure in the vessel by feeding hydrogen gas into the heated vessel, and d) cooling and filtering the product produced in steps a through c.

Preferably, the vapor pressure of hydrogen is between about 50 psig to about 1000 psig.

Preferably, the catalyst is selected from the group consisting of a nickel-based catalyst, copper, copper-chromite, platinum and palladium.

Preferably, the hydrogenated copolymer/vegetable oil product has an iodine value below about 110. More preferably, the iodine value is below about 70, most preferably below about 30.

It has been discovered that hydrogenation of the carbon-carbon double bonds in polymerized, blown, copolymer and copolymer/vegetable blend oils increases the solidification point, improves oxidative stability, decreases reactivity and increases crystallinity. It has further been found that such hydrogenated oil compositions display properties similar to petrolatums and micro-crystalline waxes. If only partial hydrogenation of such an oil is carried out, a chemically reactive semi-solid or wax-like material is produced. Partially hydrogenated oils are capable of forming cross-linked network structures. Other materials such as neat vegetable oils, hydrogenated vegetable oils, oil blends, polyglycerol esters and hydrogenated triglycerides can be blended with the hydrogenated oils to further modify physical properties as desired.

It has also been discovered that blown oils or copolymer oils containing free hydroxyl moieties can be hydrogenated to yield a product similar to petrolatums and micro-crystalline waxes, or useful in coatings, including but not limited to urethane coatings. Such hydrogenated oils have hydroxyl values below about 150. The hydroxyl moieties that can be useful sites for further chemical modifications of the present invention.

High eurucic acid rapeseed oil (HEAR) is a type of rapeseed oil typically containing between 40 and 50% eurucic acid.

Fatty acids are composed of a carboxylic acid attached to an alkyl chain. The alkyl chain may be saturated or unsaturated, and branched, cyclic or straight.

The term "genetically-modified plant oils" refers to an oil derived from a crop source that has been genetically altered or manipulated by a chemical, biological or recombinant technological process, wherein after such a process the genetic material of the crop source is modified.

The following examples demonstrate some of the properties of the compositions of the present invention described herein. Iodine Value is the number of centigrams of iodine absorbed under standard conditions by 1 gram of fat. It is a measure of the average degree of unsaturation. Hydroxyl value is defined as the milligrams of potassium hydroxide equivalent to the hydroxy content in 1 gram of sample material.

EXAMPLES

Example 1

Hydrogenation of P—S Gardener Viscosity Heat Bodied Linseed Oil

Alinco Q (ADM) was used as the starting material. The raw material specifications of Alinco Q include a Gardener viscosity of P—S and an iodine value of 130-150. Alinco Q (600 g) was added to a 1 L stainless steel reaction vessel with 3 g of a nickel catalyst (G-53, Sud Chemie). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h.

Example 2

Hydrogenation of X Gardener Viscosity Heat Bodied Linseed Oil

Alinco X (ADM) was used as the starting material. The raw material specifications of Alinco X include a Gardener viscosity of X and an iodine value of 120-130. Alinco X (600 g) was added to a 1 L stainless steel reaction vessel with 3 g of a nickel catalyst (G-53, Sud Chemie). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h. The reaction was then cooled and filtered to remove the nickel catalyst. The IV of the final product was 10.5.

Example 3

Hydrogenation of X Gardener Viscosity Heat Bodied Soybean Oil

Heat bodied soybean oil with an X Gardener viscosity (ADM) was used as the starting material. X-bodied soy (600 g) was added to a 1 L stainless steel reaction vessel with 6 g of a nickel catalyst (G-53, Sud Chemie). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h. The reaction was then cooled and filtered to remove the nickel catalyst.

Example 4

Hydrogenation of Y Gardener Viscosity Heat Bodied Linseed Oil

Alinco Y (ADM) was used as the starting material. The raw material specifications of Alinco Y include a Gardener viscosity of Y and an iodine value of 120-130. Alinco Y (600 g) was added to a 1 L stainless steel reaction vessel with 6 g of a nickel catalyst (G-53, Sud Chemie). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h. The reaction was then cooled and filtered to remove the nickel catalyst.

Example 5

Hydrogenation of $Z_4$ Gardener Viscosity Heat Bodied Linseed Oil

OKO M 2-1/2 (ADM) was used as the starting material. The raw material specifications of OKO M 2-1/2 include a Gardener viscosity of $Z_4$ and an iodine value of 115-130. OKO M 2-1/2 (600 g) was added to a 1 L stainless steel reaction vessel with 6 g of a nickel catalyst (G-53, Sud Chemie). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h. The reaction was then cooled and filtered to remove the nickel catalyst. The IV of the final product was 15.5.

Example 6

Hydrogenation of $Z_9$ Gardener Viscosity Heat Bodied Linseed Oil

OKO M-37 (ADM) was used as the starting material. The raw material specifications of OKO M-37 include a Gardener viscosity of $Z_9$ and an iodine value of 115-130. OKO M-37 (600 g) was added to a 1 L stainless steel reaction vessel with 6 g of a nickel catalyst (G-53, Sud Chemie). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 16 h. The reaction was then cooled and filtered to remove the nickel catalyst.

TABLE 1

Hydrogenated Bodied Oil Test Data

| Sample | Kinematic Viscosity (D445) (cSt) | Congealing Point (D938) (° F.) | Cone Penetration (D937) (dmm) |
|---|---|---|---|
| Example 1 | 33.0 | 84 | too soft |
| Example 4 | 73.0 | 97 | 126 |
| Example 5 | 157 | 95 | 95 |
| Example 6 | N/A* | 93 | 222 |

*Data out of viscosity range.

Example 7

Polyglycerol Esters of Behenic Acid as Crystal Enhancer

Triglycerol (Solvay) and methyl behenate (Proctor & Gamble) and potassium carbonate were added to a 250 mL roundbottom flask equipped with mechanical stirring, a barret style receiver, condenser and nitrogen purge. The reaction was carried out at 165° C. for six hours with removal of methanol. The resulting material was a hard solid waxy material with a melting point ~80° C. This material could be added to hydro-bodied oils, described in previous examples, to modify the crystallinity, physical properties, and melting point of the final material.

Example 8

Hydro Soy/HEAR Oil as Crystal Enhancer for Hydro Bodied-Oils

A blend of fully hydrogenated soy oil and HEAR oil (50 g) was added to hydro-bodied oil (OKO M2-1/2) in example 5 (50 g). The components were fully miscible and were blended in the liquid state. The resulting material had a higher melting point and increased hardness in comparison to the hydro-bodied oil in example 4. Hydrogenated soy/HEAR oil could be added to hydro-bodied oils, described in previous examples, to modify the crystallinity, physical properties, and melting point of the final material.

| | |
|---|---|
| Congeal Point (ASTM D938) | 120° F. |
| Drop Melt Point (ASTM D127) | 138° F. |
| Kinematic Viscosity @ 210° F. (ASTM D445) | 37 cst |
| Needle Penetration @ 77° F. (ASTM D1321) | 25 dmm |

Example 9

Partial Hydrogenation of $Z_4$ Gardener Viscosity Heat Bodied Linseed Oil

OKO M 2-1/2 (ADM) was used as the starting material. The raw material specifications of OKO M 2-1/2 include a Gardener viscosity of $Z_4$ and an iodine value of 115-130. OKO M 2-1/2 (600 g) was added to a 1 L stainless steel reaction vessel with 3 g of a nickel catalyst (G-53, Sud Chemie). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig. Samples were taken every hour for four hours. The reaction was then cooled and filtered to remove the nickel catalyst. The IV of the final product (4 hour) was 57.8. See Table 2 for IV results.

Example 10

Partial Hydrogenation of X Gardener Viscosity Heat Bodied Linseed Oil

Alinco X (ADM) was used as the starting material. The raw material specifications of Alinco X include a Gardener viscosity of X and an iodine value of 120-130. Alinco X (600 g) was added to a 1 L stainless steel reaction vessel with 3 g of a nickel catalyst (G-53, Sud Chemie). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig. Samples were taken every hour for four hours. The reaction was then cooled and filtered to remove the nickel catalyst. The IV of the final product (4 hour) was 40.2. See Table 2 for IV results.

TABLE 2

Iodine Values of Bodied Oils at Various Reaction Times

| Sample | 1 h | 2 h | 3 h | 4 h |
|---|---|---|---|---|
| OKO M2 1/2 (example 9) | 95.8 | 79.1 | 64.5 | 57.8 |
| Alinco X (example 10) | 69.2 | 47.8 | 40.9 | 40.2 |

Example 11

Hydro Soy Oil as Crystal Enhancer for Hydro Bodied-Oils

A blend of 2 IV fully hydrogenated soy oil (50 g) was added to hydro-bodied oil (OKO M2-1/2) in example 5 (50 g). The components were fully miscible and were blended in the liquid state. The resulting material had a higher melting point and increased hardness in comparison to the hydro-bodied oil from example 5. Hydrogenated soy oil could be added to hydro-bodied oils, described in previous examples, to modify the crystallinity, physical properties, and melting point of the final material.

| | |
|---|---|
| Congeal Point (ASTM D938) | 124° F. |
| Drop Melt Point (ASTM D127) | 126° F. |
| Kinematic Viscosity @ 210° F. (ASTM D445) | 38.5 cst |
| Needle Penetration @ 77° F. (ASTM D1321) | 41 dmm |

Example 12

Hydro Soy Oil and Behenic Acid Esters of Triglycerol as Crystal Enhancer for Hydro Bodied-Oils A blend of 2 IV fully hydrogenated soy oil (36 g) and Behenic acid esters of triglycerol (4 g) was added to hydro-bodied oil (OKO M2-1/2) from example 5 (40 g). The components were fully miscible and were blended in the liquid state. The resulting material had a higher melting point and increased hardness in comparison to the hydro-bodied oil in example 4. Hydrogenated soy oil could be added to hydro-bodied oils, described in previous examples, to modify the crystallinity, physical properties, and melting point of the final material.

| | |
|---|---|
| Congeal Point (ASTM D938) | 130° F. |
| Drop Melt Point (ASTM D127) | 133° F. |
| Kinematic Viscosity @ 210° F. (ASTM D445) | 40.7 cst |
| Needle Penetration @ 77° F. (ASTM D1321) | 45 dmm |

Example 13

Deodorization of Hydro Bodied Oils

Residual free fatty acids are present in heat bodied oils. These free fatty acids along with residual odor-causing byproducts of hydrogenation can be removed from the hydro bodied oils by deodorization. Deodorization is a process used in the refining of vegetable oils (Y. H. Hui, ed. Bailey's Industrial Oil and Fat Products, 5$^{th}$ edition, Vol. 2, p 537-540). Hydro OKO M 2-1/2 was deodorized at 230° C. for 30 min under a vacuum of about 1 torr. The steam rate for the run was approximately 5% water on the oil.

Example 14

Hydrogenated bodied linseed oil (hydrogenated OKO M 2-1/2, ADM), NuSun sunflower oil (ADM) and a 50/50 mixture of hydro soy/hydro high eurucic acid rapeseed (HEAR) oil were blended at the following amounts:
50 g NuSun Oil
25 g Hydrogenated OKO M 2-1/2
25 g 50/50 hydro soy/hydro HEAR
The above materials were mixed in the liquid state above 60° C. When the mixture reached 60° C., it was then placed in a refrigerator at 5° C. to finish cooling. The final material was an opaque material that had a consistency similar to petroleum jelly.

Example 15

Hydrogenated bodied soybean oil (hydrogenated X-bodied soybean oil, ADM), RBD Soybean oil (ADM) and behenic acid esters of triglycerol were blended at the following amounts:
50 g RBD Soybean Oil
49 g Hydrogenated Bodied Soybean Oil (X-Bodied Soybean Oil)
1 g Behenic acid esters of triglycerol
The above materials were mixed in the liquid state above 60° C. When the mixture reached 60° C., it was then placed in a refrigerator at 5° C. to finish cooling. The final material was an off-white, opaque semi-solid that had a consistency similar to petroleum jelly.

Example 16

Hydrogenated bodied linseed oil (hydrogenated OKO M 2-1/2, ADM), NuSun sunflower oil (ADM) and a partially hydrogenated soybean oil were blended at the following amounts:
50 g NuSun Oil
25 g Hydrogenated OKO M 2-1/2
25 g Partially hydrogenated soybean oil (42 IV)
The above materials were mixed in the liquid state above 60° C. When the mixture reached 60° C., it was then placed in a refrigerator at 5° C. to finish cooling. The final material was an off-white, opaque, viscous liquid that had a consistency similar to petroleum jelly.

Example 17

Hydrogenated bodied linseed oil (hydrogenated OKO M 2-1/2, ADM), hydrogenated bodied soybean oil (hydrogenated X-bodied soybean oil, ADM), NuSun sunflower oil (ADM), a 50/50 mixture of hydro soy/hydro high eurucic acid rapeseed (HEAR) oil and Vitamin E (ADM) were blended at the following amounts:
40 g Hydrogenated OKO M 2-1/2
25 g NuSun Oil
24 g Hydrogenated X-Bodied Soybean Oil
10 g 50/50 hydro soy/hydro HEAR
1 g Vitamin E, 100% d-alpha tocopherol
The above materials were mixed in the liquid state above 60° C. When the mixture reached 60° C., it was then placed in a refrigerator at 5° C. to finish cooling. The final material was an off-white, opaque semi-solid that had a consistency similar to petroleum jelly.

Example 18

Hydrogenation of a Heavy Bodied Blown Linseed Oil

Heavy bodied blown linseed oil (ADM) was used as the starting material. The blown linseed oil (600 g) was added to a 1 L stainless steel reaction vessel with 6 g of a nickel catalyst (G-53, Sud Chemie). The vessel was purged with hydrogen five times and then pressurized to 200 psig. The reaction was then heated to 230° C. After reaching 230° C., the reaction vessel was pressurized to 300 psig. A continuous feed of hydrogen gas was used holding the pressure of the vessel at 300 psig for 6 h. The reaction was then cooled and filtered to remove the nickel catalyst. The final material was an opaque yellow solid with a hydroxyl value of 77.5, and an IV value of 18.1.

Example 19

Hydrogenation of Blown Soybean Oil

Blown soybean oil (Cargill 680 Blown Soybean Oil) was used as the starting material. The blown soybean oil (600 g) was added to a 1 L stainless steel reaction vessel with 6 g of a nickel catalyst (G-53, Sud Chemie). The vessel was purged with hydrogen five times and then pressurized to 200 psig. The reaction was then heated to 230° C. After reaching 230° C., the reaction vessel was pressurized to 300 psig. A continuous feed of hydrogen gas was used holding the pressure of the vessel at 300 psig for 6 h. The reaction was then cooled and filtered to remove the nickel catalyst. The final material was an opaque yellow solid with a hydroxyl value of 93.

Example 20

Hydrogenation of ML-189 (Dicyclopentadiene-linseed Oil Copolymer)

ML-189 (600 g), manufactured by ADM, was added to a 1 L stainless steel reaction vessel with 3 g of a nickel catalyst (G-53, Sud Chemie). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 8 h. After hydrogenation, the signal at ~5.2 ppm corresponding to the olefin component was not present in the NMR spectrum. The hydrogenated material was a hard wax-like solid at room temperature with a melting point of 44.7° C. (Mettler drop point).

Example 21

Hydrogenation of Toplin X-Z (Linseed Oil Copolymer)

Toplin X-Z (600 g), manufactured by ADM, was added to a 1 L stainless steel reaction vessel with 3 g of a nickel catalyst (G-53, Sud Chemie). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 8 h. The hydrogenated material was a hard wax-like solid at room temperature with a melting point of 49.9° C. (Mettler drop point). After hydrogenation, the signal at 5.2 ppm corresponding to the olefin component was not present in the NMR spectrum.

Example 22

Partial Hydrogenation of Toplin X-Z (Linseed Oil Copolymer)

Toplin X-Z (600 g), manufactured by ADM, was added to a 1 L stainless steel reaction vessel with 3 g of a nickel catalyst (G-53, Sud Chemie). The vessel was purged with hydrogen five times and then pressurized to 200 psig. The reaction was the heated to 230° C. After reaching 230° C., the reaction vessel was pressurized to 300 psig. A continuous feed of hydrogen gas was used holding the pressure of the vessel at 300 psig for 2 h. The hydrogenated material was a soft semi-solid material. After hydrogenation, NMR analysis indicated that the signal at 5.2 ppm corresponding to the olefin component was reduced by 50%.

Example 23

Blend of Hydrogenated Heat Bodied Oil and Hydrogenated HEAR Oil

Hydrogenated bodied linseed oil (OKO M2.5, ADM), 100 g, was melted and mixed with 100 g of melted hydrogenated HEAR (high eurucic acid rapeseed) oil. The mixture was then allowed to cool to room temperature. At room temperature, the mixture was a white, hard, waxy solid. Peak melting point was ~58° C.

Example 24

Blend of Hydrogenated Heat Bodied Oil and Hydrogenated Castor Oil

Hydrogenated bodied linseed oil (OKO M2.5, ADM), 100 g, was melted and mixed with 100 g of melted hydrogenated castor oil (Sud Chemie). The mixture was then allowed to cool to room temperature. At room temperature, the mixture was a white, hard, waxy solid. Mettler drop point was 85.8° C. Peak melting point was ~80° C.

Having now fully described this invention, it will be understood to those of ordinary skill in the art that the same can be performed within a wide and equivalent range of conditions, formulations, and other parameters without affecting the scope of the invention or any embodiment thereof. All patents, patent applications, and publications cited herein are fully incorporated by reference herein in their entirety.

What is claimed is:

1. A composition comprising a hydrogenated heat polymerized triacylglycerol oil, said hydrogenated heat polymerized triacylglycerol oil having carbon-carbon bonds between triacylglycerol units of said oil.

2. The composition of claim 1, wherein said hydrogenated heat polymerized triacylglycerol oil has an iodine value below about 110.

3. The composition of claim 1, wherein said hydrogenated heat polymerized triacylglycerol oil has an iodine value below about 70.

4. The composition of claim 1, wherein said hydrogenated heat polymerized triacylglycerol oil has an iodine value below about 30.

5. The composition of claim 2, wherein said hydrogenated heat polymerized triacylglycerol oil is derived from an oil selected from the group consisting of fish, animal, vegetable, synthetic and genetically-modified plant oils, and derivatives and mixtures thereof.

6. The composition of claim 2, wherein said hydrogenated heat polymerized triacylglycerol oil is derived from a vegetable oil.

7. The composition of claim 6, wherein the vegetable oil is selected from the group consisting of high eurucic acid rapeseed, soybean, safflower, canola, castor, sunflower and linseed oils.

8. The composition of claim 7, further comprising one or more vegetable oils.

9. The composition of claim 8, wherein said hydrogenated heat polymerized triacylglycerol oil is derived from linseed or soy oil and said vegetable oil is sunflower, high eurucic acid rapeseed or soy oil.

10. The composition of claim 7, further comprising a fatty acid ester of triglycerol.

11. The composition of claim 10, wherein said fatty acid ester of triglycerol is behenic acid ester of triglycerol.

12. The composition of claim 7, further comprising one or more hydrogenated vegetable oils.

13. The composition of claim 12, wherein said one or more hydrogenated vegetable oil is derived from high eurucic acid rapeseed, soy or castor oil, and said hydrogenated heat polymerized triacylglycerol oil is derived from linseed oil.

14. The composition of claim 12, further comprising a fatty acid ester of triglycerol.

15. The composition of claim 14, wherein said one or more hydrogenated vegetable oils is soy oil and said fatty acid ester of triglycerol is behenic acid ester of triglycerol, wherein said hydrogenated soy oil is blended with said behenic acid ester of triglycerol to form a first blend, wherein said first blend is admixed with said hydrogenated heat polymerized triacylglycerol oil to form said composition.

16. The composition of claim 15 wherein said hydrogenated heat polymerized triacylglycerol oil is derived from linseed oil.

17. The composition of claim 8 further comprising a fatty acid ester of triglycerol.

18. The composition of claim 17 wherein said vegetable oil is soy oil, said fatty acid ester of triglycerol is behenic acid ester and said hydrogenated heat polymerized triacylglycerol oil is soy oil.

19. The composition of claim 12, wherein said one or more hydrogenated vegetable oils are blended to form a first oil mixture, wherein said first oil mixture is admixed with said hydrogenated heat polymerized triacylglycerol oil to form said composition.

20. The composition of claim 19, wherein said first oil mixture is admixed with said hydrogenated heat polymerized triacylglycerol oil at a ratio of between about 1:1 to about 1:100 first oil mixture to hydrogenated heat polymerized triacylglycerol oil.

21. The composition of claim 20, wherein said first oil mixture is a blend of hydrogenated vegetable oils derived from the group consisting of castor, high eurucic acid rapeseed and soy oils, and said hydrogenated heat polymerized triacylglycerol oil is derived from linseed or soy oils.

22. The composition of claim 21, wherein said first oil mixture consists essentially of hydrogenated soy and hydrogenated high eurucic acid rapeseed oils, and said hydrogenated heat polymerized triacylglycerol oil is derived from linseed oil.

23. The composition of claim 22, further comprising a vegetable oil selected from the group consisting of high eurucic acid rapeseed, soybean, safflower, canola, castor, sunflower and linseed oils.

24. The composition of claim 23 wherein said vegetable oil is sunflower oil.

25. The composition of claim 24, further comprising an antioxidant, wherein said antioxidant is vitamin E.

26. The composition of claim 14, further comprising one or more vegetable oils.

27. The composition of claim 25, further comprising an additional hydrogenated heat polymerized triacylglycerol oil.

28. The composition of claim 23, wherein said hydrogenated heat polymerized triacylglycerol oil, said first oil mixture and said vegetable oil are present at a ratio of about 1:1:2, respectively.

29. A composition comprising a hydrogenated blown triacylglycerol oil, said hydrogenated blown oil having carbon-carbon and ether linkages between triacylglycerol units of said oil.

30. The composition of claim 29, wherein said hydrogenated blown triacylglycerol oil has an iodine value below about 110.

31. The composition of claim 29, wherein said iodine value is below about 70.

32. The composition of claim 29, wherein said iodine value is below about 30.

33. The composition of claim 30, wherein said hydrogenated blown triacylglycerol oil is derived from an oil selected from the group consisting of fish, animal, vegetable, synthetic and genetically-modified plant oils, and derivatives and mixtures thereof.

34. The composition of claim 33, wherein said hydrogenated blown triacylglycerol oil is derived from a vegetable oil.

35. The composition of claim 34, wherein said vegetable oil is selected from the group consisting of high eurucic acid rapeseed, soybean, safflower, canola, castor, sunflower and linseed oils.

36. The composition of claim 35, wherein said vegetable oil is linseed or soy oil.

37. A composition comprising a hydrogenated copolymer triacylglycerol oil, said hydrogenated copolymer oil having bonds between carbons on triacylglycerol units and copolymer of said oil.

38. The composition of claim 37, wherein the hydrogenated copolymer triacylglycerol oil has an iodine value below about 110.

39. The composition of claim 37, wherein the hydrogenated copolymer triacylglycerol oil has an iodine value below about 70.

40. The composition of claim 37, wherein the hydrogenated copolymer triacylglycerol oil has an iodine value below about 30.

41. The composition of claim 39, wherein said hydrogenated copolymer triacylglycerol oil is a hydrogenated dicyclopentadiene or a hydrogenated maleic anhydride/polyol oil.

42. A composition comprising a hydrogenated copolymer triacylglycerol oil/vegetable oil blend, said hydrogenated copolymer oil of said blend having bonds between carbons on triacylglycerol units and copolymer of said copolymer oil.

43. The composition of claim 42, wherein said hydrogenated copolymer triacylglycerol oil/vegetable oil blend has an iodine value below about 110.

44. The composition of claim 42, wherein said hydrogenated copolymer triacylglycerol oil/vegetable oil blend has an iodine value below about 70.

45. The composition of claim 42, wherein said hydrogenated copolymer triacylglycerol oil/vegetable oil blend has an iodine value below about 30.

46. The composition of claim 44, wherein said hydrogenated copolymer triacyglycerol oil/vegetable oil blend is derived from a copolymer oil selected from the group consisting of hydrogenated dicyclopentadiene and a hydrogenated maleic anhydride/polyol oil, and a vegetable oil selected from the group consisting of soybean, safflower, canola, castor, sunflower and linseed oils.

47. The composition of claim 46, wherein said hydrogenated copolymer triacylglycerol oil/vegetable oil blend is derived from a blend of a copolymer oil and a vegetable oil.

48. The composition of claim 47, wherein said hydrogenated copolymer triacylglycerol oil/vegetable oil is derived from a blend of dicyclopentadiene and linseed oils.

49. A process of preparing a hydrogenated oil composition comprising hydrogenating an oil, wherein said oil is selected from the group consisting of
   a) a polymerized triacylglycerol oil derived from the group of oils consisting of fish, animal, vegetable, synthetic, and genetically-modified plant oils, said polymerized oil having carbon-carbon bonds between triacylglycerol units of said oil;

b) a blown triacylglycerol oil derived from the group of oils consisting of fish, animal, vegetable, synthetic, and genetically-modified plant oils, said blown oil having carbon-carbon and ether linkages between triacylglycerol units of said oil;

c) a copolymer triacylglycerol oil derived from the group of oils consisting of dicyclopentadiene and maleic anhydride/polyol oils, said copolymer oil having bonds between carbons on triacylglycerol units and copolymer of said oil; and d) a copolymer triacylglycerol oil/vegetable oil blend, said copolymer oil of said blend having bonds between carbons on triacylglycerol units and copolymer of said oil, wherein a hydrogenated oil is produced.

50. The process of claim 49, wherein said hydrogenating comprises reacting said oil under a vapor pressure of hydrogen in the presence of a catalyst.

51. The process of claim 50, wherein said vapor pressure is between about 50 psig to about 1000 psig.

52. The process of claim 50, further comprising:
a) purging a reaction vessel containing said oil and a catalyst with hydrogen prior to pressurizing with hydrogen,
b) heating the pressurized vessel containing said oil and catalyst to a temperature of between about 150° C. to about 400° C.,
c) adjusting the vapor pressure in the vessel by feeding hydrogen gas into the heated vessel, and
d) cooling and filtering the product produced in steps a through c.

53. The process of claim 50 or 52, wherein said catalyst is selected from the group consisting of a nickel-based catalyst, copper, copper-chromite, platinum and palladium.

54. The process of claim 50 or 52, wherein said composition has an iodine value below about 110.

55. The process of claim 50 or 52, wherein said composition has an iodine value below about 70.

56. The process of claim 50 or 52, wherein said composition has an iodine value below about 30.

* * * * *